US009002640B2

(12) United States Patent
Beaurepaire et al.

(10) Patent No.: US 9,002,640 B2
(45) Date of Patent: Apr. 7, 2015

(54) APPARATUS AND ASSOCIATED METHODS

(71) Applicant: Nokia Corporation, Espoo (FI)

(72) Inventors: Jerome Beaurepaire, Berlin (DE); Philippe Beaurepaire, Lamballe (FR)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/709,760

(22) Filed: Dec. 10, 2012

(65) Prior Publication Data
US 2014/0163861 A1    Jun. 12, 2014

(51) Int. Cl.
*G01C 21/00* (2006.01)
*G06Q 10/00* (2012.01)
*G06Q 50/00* (2012.01)

(52) U.S. Cl.
CPC ................ *G01C 21/00* (2013.01); *G06Q 10/00* (2013.01); *G06Q 50/00* (2013.01)

(58) Field of Classification Search
USPC .................................. 701/400, 409, 429, 465
See application file for complete search history.

(56) References Cited

U.S. PATENT DOCUMENTS

| 6,085,129 | A | * | 7/2000 | Schardt et al. ................... 701/14 |
| 6,662,105 | B1 | * | 12/2003 | Tada et al. ...................... 701/420 |
| 6,933,860 | B1 | | 8/2005 | Gehman |
| 7,430,473 | B2 | * | 9/2008 | Foo et al. ........................ 701/455 |
| 8,112,195 | B2 | * | 2/2012 | Kim et al. ........................ 701/36 |
| 2004/0034464 | A1 | * | 2/2004 | Yoshikawa et al. ............ 701/117 |
| 2005/0131631 | A1 | * | 6/2005 | Nakano et al. ................. 701/200 |
| 2007/0155404 | A1 | * | 7/2007 | Yamane et al. ............. 455/456.1 |
| 2008/0086455 | A1 | * | 4/2008 | Meisels et al. ..................... 707/3 |
| 2008/0208453 | A1 | * | 8/2008 | Fujimoto ........................ 701/202 |
| 2009/0082960 | A1 | * | 3/2009 | Ramaswamy et al. ......... 701/211 |
| 2010/0114406 | A1 | | 5/2010 | DeJonge et al. |
| 2011/0208417 | A1 | | 8/2011 | Fink et al. |
| 2012/0249456 | A1 | * | 10/2012 | Taka et al. ...................... 345/173 |

OTHER PUBLICATIONS

"*ETA (Estimated Time of Arrival;*" brickfish; dated Jun. 24, 2010; retrieved on Mar. 28, 2013 from <https://www.brickfish.com/pages/blogs/blogview.aspx?bid=41265&scid=538&returnurl=list&>.
"*Garmin E trex;*" Google: Groups; retrieved on Jul. 12, 2012 from <https://groups.google.com/forum/?fromgroups=#!topic/uk.rec.walking/bz7wk6zuf_8>.
"*Interactive ETA Map;*" Frontier; retrieved on Jul. 12, 2012 from <http://www.frontierscs.com/etamap>.

* cited by examiner

*Primary Examiner* — Hussein A. Elchanti
(74) *Attorney, Agent, or Firm* — Alston & Bird LLP

(57) ABSTRACT

An apparatus, the apparatus comprising at least one processor, and at least one memory including computer program code, the at least one memory and the computer program code configured, with the at least one processor, to cause the apparatus to perform at least the following: provide at least one marker to indicate the required current position in a planned journey to reach a destination of the planned journey according to a predetermined time criterion.

20 Claims, 8 Drawing Sheets

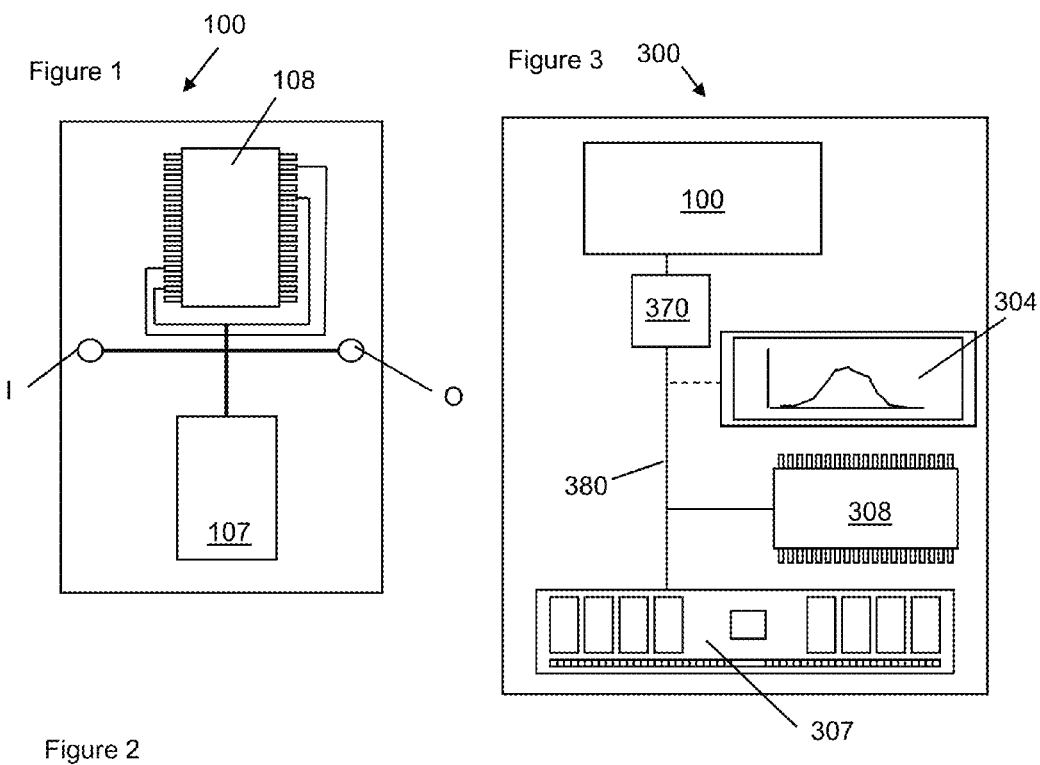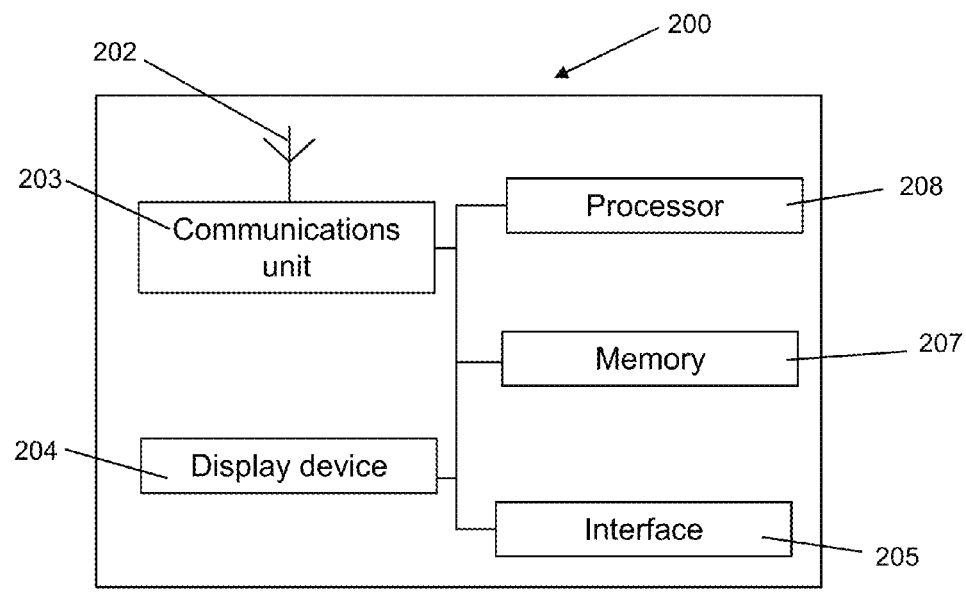

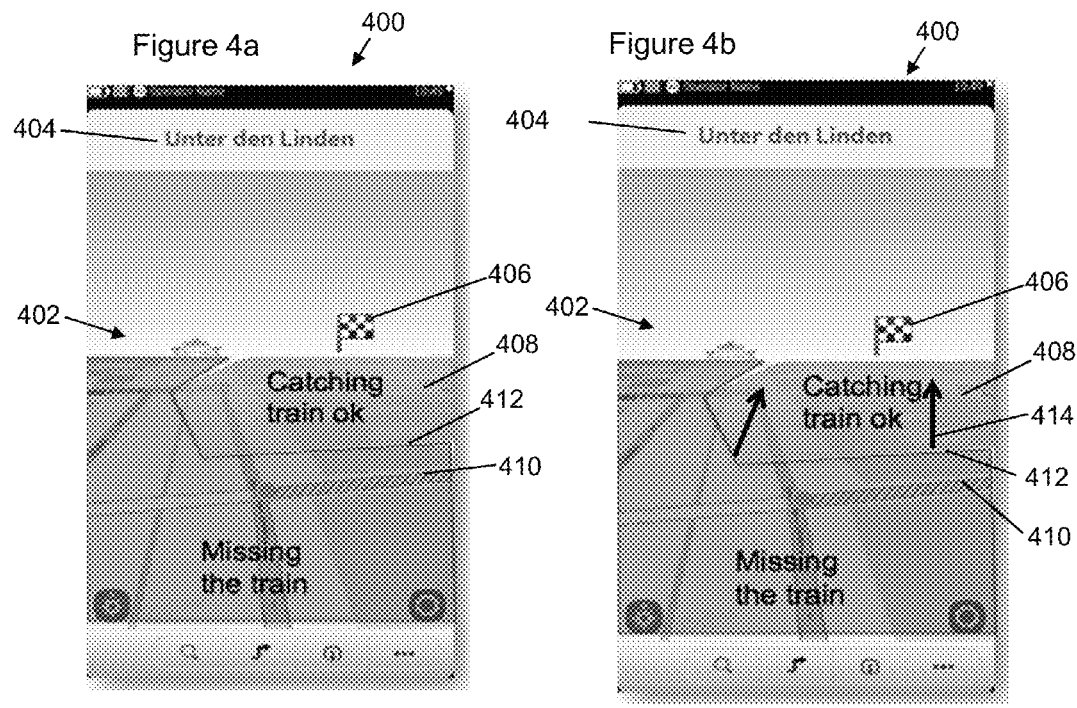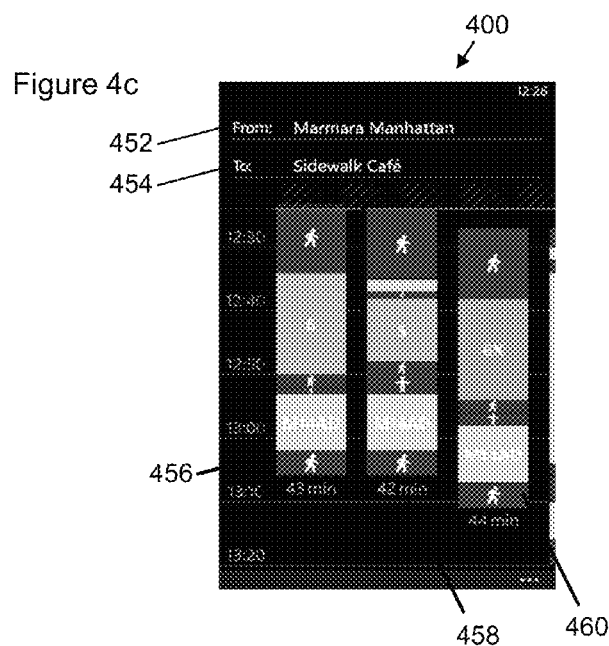

Figure 10a
Figure 10b
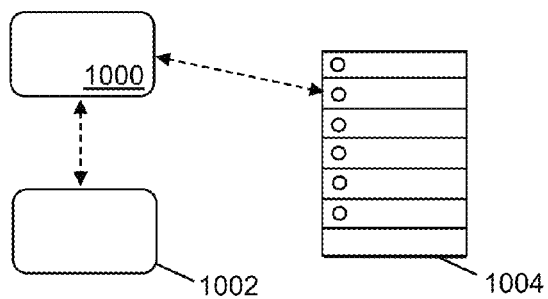
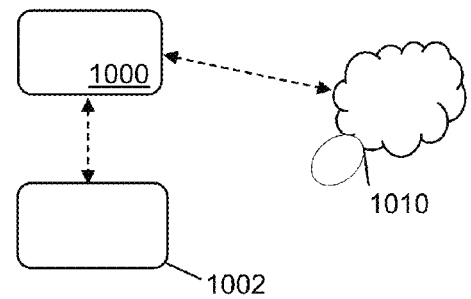
Figure 11
Providing at least one marker to indicate, on a map, the required current position in a planned journey to reach a destination of the planned journey according to a predetermined time criterion. ── 1100
Figure 12
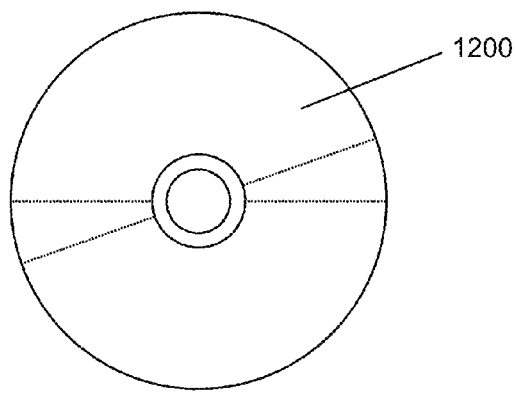

APPARATUS AND ASSOCIATED METHODS

TECHNICAL FIELD

The present disclosure relates to user interfaces and navigation, associated methods, computer programs and apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs), mobile telephones, smartphones and other smart devices, and tablet PCs.

The portable electronic devices/apparatus according to one or more disclosed aspects/embodiments may provide one or more audio/text/video communication functions (e.g. telecommunication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

In planning a journey, it is often desirable to arrive at a particular place at a particular time. For example, in travelling to the cinema, a person may wish to arrive 10 minutes before the film they wish to see is due to start. As another example, a person planning to travel by bus would like to arrive at the bus stop or station in time to catch the bus they need.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect there is provided an apparatus, the apparatus comprising:
   at least one processor; and
   at least one memory including computer program code,
   the at least one memory and the computer program code configured, with the at least one processor, to cause the apparatus to perform at least the following:
      provide at least one marker to indicate the required current position in a planned journey to reach a destination of the planned journey according to a predetermined time criterion.

The apparatus is configured to provide at least one marker which indicates whether or not the user is on schedule to arrive at a destination at a particular time, or if they will be late. One example is of an estimated time of arrival (ETA) isoline displayed on a map, which may be considered a contour/isopleth displayed around a destination. If the user is located close enough to the destination, and is travelling at a sufficient speed that they will arrive at the destination on time then the user's position will be between the marker and the destination in an "on time" zone. If the user is travelling too slowly, or is too far away from the destination, then the user's position will be beyond the marker away from the destination in a "late" zone. The user may be able to speed up to catch up to the marker, and thus they may actually arrive on time, having previously been in a position where they would have arrived late. By providing a marker as a visual indicator, the user need not consider the current time and ETA and then calculate/judge whether or not they are likely to arrive in time. From a simple visual marker the user may readily see whether they are likely to arrive on time or not and if they are going to be late, whether they can speed up to arrive on time. In certain embodiments, a user may be able to see his/her actual current location, for example on a map. In other embodiments the user's current location may not be marked.

The apparatus may be configured such that the predetermined time criterion is at least one of a discrete time which is set to reach the destination by the set discrete time and a time range which is set to reach the destination within the set time range. For example a user may need to be at a tram stop to catch a tram departing at a particular discrete time, or the user may need to arrive at an event between 10 am and 11 am in a one hour time range, for example.

The apparatus may be configured such that the destination is at least one of the ultimate destination of the planned journey and an intermediate destination of the planned journey. Thus the user may be travelling from their house, by car, to work. The destination of the workplace may be used as an ultimate destination. If the user is travelling from their house by bus, and then by tram, to work, then the destinations of the bus stop, tram stop, and workplace, may all be considered as intermediate destinations on the route.

The apparatus may be configured such that the predetermined time criterion is set to allow the destination to be reached within an originally calculated estimated time of arrival at the destination.

The apparatus may be configured such that the predetermined time criterion is set to allow for a predetermined travel connection to be made within the planned journey. Thus if a user needs to catch a train departing at 13:25, the predetermined time criterion may be set to allow for the user to catch the train as a travel connection within the journey. This may be by providing a marker to show where the user needs to be in order to arrive at the train station at 13:25, or in another example the marker may be displayed to show where the user needs to be in order to arrive at the train station at 13:15, thereby providing an extra 10 minutes for the user to purchase a ticket, find the platform and correct carriage and board the train.

The predetermined travel connection may be a connection with at least one of public and private transport connections. The travel connection may thus relate to a user planning to catch a bus, tram, train, plane, or take a taxi, walk, or drive to a destination, for example.

The apparatus may be configured such that at least one of the predetermined time criterion, the destination, and the planned journey, is based on received time and/or location indications from a calendar application. For example, a user may have a calendar entry stored in a personal electronic device, of "9 pm at Mario's". The apparatus may be configured to identify the required time of arrival as 9 pm, and the destination of "Mario's", from the calendar entry, and use them to indicate a marker on a map for the user who can they easily see where he/she needs to be on their journey that evening to arrive at Mario's at 9 pm.

The apparatus may be configured such that the predetermined time criterion is set by at least one of a user, and an automatic calculation by an apparatus to reach the destination by a required time.

The at least one marker may be a point marker, a line marker, a zone marker, or a text marker, the marker providing an indication of the required current position in the planned journey to reach the destination according to the predetermined time criterion. Certain such markers (e.g., point, line, zone, target and arrow markers) may be considered graphical markers. The at least one marker may be provided by being output on a map or output associated with a map (for example, output for display next to a map) In other embodiments, it need not be associated with a map (for example, the marker may be output with a text-based list of directions). The marker may be a three-dimensional (3D) marker, for example displayed on a 3D map or in a 3D navigation application.

The at least one marker may provide one or more lines, each line providing an indication of the likelihood of reaching the destination according to the predetermined time criterion. Each line may be associated with a different likelihood/probability of reaching the destination according to the predetermined time. In certain cases, each line may represent a different bus connection, different routes, or different travel speeds (e.g., by bicycle, by foot or by car) for example.

The at least one marker may provide one or more zones, each zone providing an indication of the likelihood of reaching the destination according to the predetermined time criterion. Each zone may be associated with a different likelihood/probability of reaching the destination according to the predetermined time. In certain cases, each zone may represent a different public transport connection (i.e. a zone each for the next tram, bus, and train), different routes, or different arrival times/predetermined time criteria, for example.

The zones may be colour coordinated with at least one colour from the group: red, amber, and green;
  red indicating a strong likelihood of reaching the destination outside the predetermined time criterion;
  amber indicating an intermediate likelihood of reaching the destination within the predetermined time criterion; and
  green indicating a strong likelihood of reaching the destination within the predetermined time criterion.

The apparatus may be configured to consider a buffer time which automatically adds on the pre-configured buffer time to the time required to be at a destination, in order to allow for any short-term delays. Thus if the user needs to be at the train station to catch a train at 13:50, the apparatus may determine that the buffer time is 10 minutes and set a predetermined time criterion of arrival at the train station of 13:40. The buffer time may allow for short delays in waiting for traffic before crossing a road, queuing to purchase ticket or pass a ticket barrier, and finding the required platform, for example.

The apparatus may be configured to provide the at least one marker by calculating the required current position in a planned journey to reach the destination of the planned journey according to the predetermined time criterion. The apparatus may be configured to provide the at least one marker by outputting for display the required current position in a planned journey to reach the destination of the planned journey according to the predetermined time criterion. The apparatus may be configured to provide the at least one marker by providing signalling associated with the required current position in a planned journey to reach the destination of the planned journey according to the predetermined time criterion. Therefore the apparatus may be configured to calculate the required current position, output/display the marker for display and/or provide/generate signalling for providing the marker.

The apparatus may be configured such that the predetermined time criterion is at least one of set at the outset of the planned journey, and updatable during the planned journey.

The apparatus may be configured to dynamically update the one or more markers during the planned journey based on one or more of:
  a current speed of the traveller;
  the cumulative distance travelled by the traveller;
  the travel distance left for the traveller to reach the destination;
  current traffic messaging for the planned journey;
  delay messaging for the planned journey;
  received messaging concerning changes in the predetermined time criterion; and
  received public transport messaging concerning changes in the predetermined time criterion.

For example, the current speed of the traveller may be determined as the traveller's instantaneous speed, his/her average speed over a predetermined past time period (for example, his/her average speed over the last 15 minutes, or one hour), or his/her previously determined personal speed (e.g. a walking speed for the user determined from a pedometer or similar). Current traffic messaging may include a scheduled departure time obtained from a live public transport information feed or road traffic updates relating to accidents or traffic jams. Delay messaging may include known delays at underground stations due to repair works or bus delays due to diversions, for example.

The apparatus may be configured to dynamically update the one or more markers at predetermined intervals. Thus the markers may move in time as the current time moves towards the predetermined time criterion to update the displayed information for the user.

The planned journey may be one of variable during travel along the planned journey and fixed after the start of travel along the planned journey.

The apparatus may be configured to update the planned journey based on at least one of traveller deviations from the planned journey and current traffic messaging for the planned journey. Therefore, if the traveller moves away from the planned route, for example to visit a different location on the way to the destination, or to avoid heavy traffic on a particular road, the apparatus may update the marker displayed to account for the change of route/journey.

The apparatus may be a portable electronic device, a laptop computer, a mobile phone, a Smartphone, a tablet computer, a personal digital assistant, a digital camera, a navigator, a server, a non-portable electronic device, a desktop computer, a monitor, or a module/circuitry for one or more of the same.

According to a further aspect, there is provided a computer program comprising computer program code, the computer program code being configured to perform at least the following: provide at least one marker to indicate the required current position in a planned journey to reach a destination of the planned journey according to a predetermined time criterion.

A computer program may be stored on a storage media (e.g. on a CD, a DVD, a memory stick or other non-transitory medium). A computer program may be configured to run on a device or apparatus as an application. An application may be run by a device or apparatus via an operating system. A computer program may form part of a computer program product.

According to a further aspect, there is provided a method, the method comprising: providing at least one marker to indicate the required current position in a planned journey to reach a destination of the planned journey according to a predetermined time criterion.

According to a further aspect there is provided an apparatus comprising means for providing at least one marker to indicate the required current position in a planned journey to reach a destination of the planned journey according to a predetermined time criterion.

The present disclosure includes one or more corresponding aspects, embodiments or features in isolation or in various combinations whether or not specifically stated (including claimed) in that combination or in isolation. Corresponding means and corresponding function units (e.g. marker provider, time determiner, route determiner) for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which:

FIG. 1 illustrates an example apparatus comprising a number of electronic components, including memory and a processor according to one embodiment of the present disclosure;

FIG. 2 illustrates an example apparatus comprising a number of electronic components, including memory, a processor and a communication unit according to another embodiment of the present disclosure;

FIG. 3 illustrates an example apparatus comprising a number of electronic components, including memory, a processor and a communication unit according to another embodiment of the present disclosure;

FIGS. 4a-4c illustrate an example of a map with a marker showing the possible locations a user must be at if they are to catch a scheduled train, a map displaying a dynamically updating marker; and a public transport planner according to the present disclosure;

FIGS. 10a-10b illustrate an example apparatus in communication with a remote server/cloud according to another embodiment of the present disclosure;

FIG. 11 illustrates a flowchart according to an example method of the present disclosure; and FIG. 12 illustrates schematically a computer readable medium providing a program.

DESCRIPTION OF EXAMPLE ASPECTS/EMBODIMENTS

Figure 5:
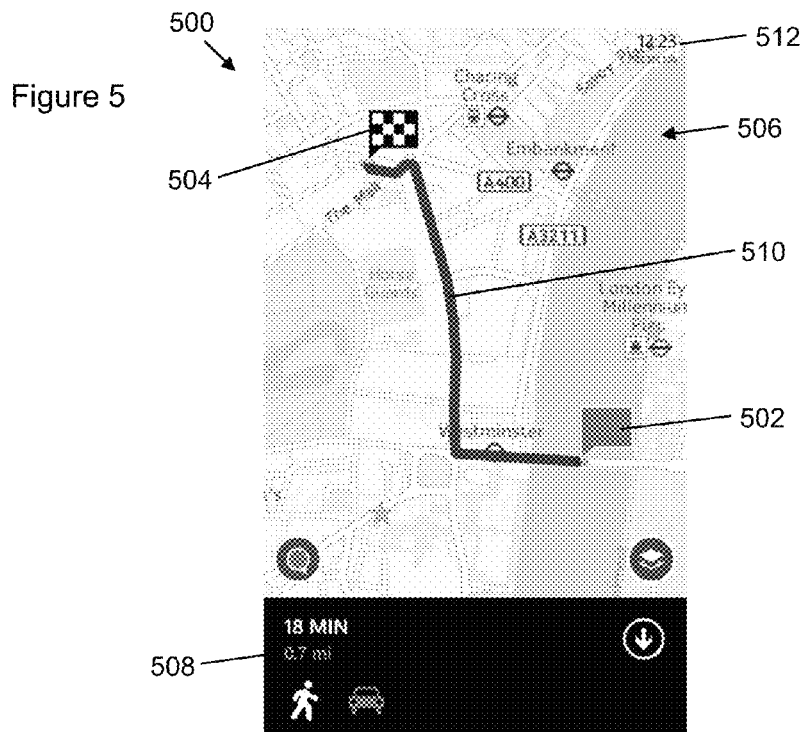
FIG. 5 illustrates an example of a map displaying a route marker showing if a user will arrive at a predetermined location at a particular time or not according to the present disclosure.

In planning a journey, it is often desirable to arrive at a particular place at a particular time. The time at which a person is likely to arrive at a particular location may be called the estimated time of arrival (ETA). A person on a journey may be provided with an ETA. For example if travelling on a train the conductor may announce the ETA for a particular location, or the ETA may be displayed on a display screen of the train. Many people own portable electronic devices which provide an ETA to a user for a particular journey. For example, a global positioning system (GPS) navigator for use in a car may provide a user with an ETA for a pre-input location, along with a route and the user's current position. Another example is that of a mobile telephone or smartphone which has GPS functionality. A person may be driving, walking, or travelling by train, for example, and use their mobile telephone/smartphone to monitor their progress on the journey by viewing their current position on a map and an ETA.

The ETA provided to a user may be given as a time value. For example, a user may be provided with a text-based value of "ETA=16:40". While this provides the user with some information as to when they are likely to arrive at their destination, it is limited. For example, the user cannot readily determine how they may be able to arrive more quickly, if they wish. Also, the ETA may relate to a scheduled event, such as the departure time of a scheduled public transport vehicle (e.g., bus, tram, train, plane), a scheduled meeting, or a scheduled start time for a movie, play, concert or sports fixture. From a text-based value of the ETA alone, the user cannot readily determine if they are likely to be able to reach the destination at the scheduled time or not. For example, if a user needs to catch a train leaving at 15:45, and their ETA is 15:50, the user cannot readily see if they are able to speed up and arrive in time to catch the train, or if they will not arrive in time to catch the train even if they speed up.

One or more examples of the present disclosure may provide advantages which overcome one or more of the above-mentioned problems. This disclosure relates to providing a marker on a map which allows a user to quickly and readily see if they are on time to arrive at a location at a particular time, or if they are late, whether or not they are likely to make up the lost time and eventually arrive in time. By providing a marker as a visual indicator, the user need not consider the current time and ETA, and then calculate/judge whether or not they are likely to arrive in time.

The marker provided may be a point, a line, or a zone (e.g., overlain on a map/indication of the traveller's current position, or separate to any indication of the traveller's current position). One example is of an ETA isoline, which is a contour/isopleth displayed around a destination. The distance away of the ETA isoline from the destination represents the boundary between the user arriving at the destination on time and the user arriving late. The ETA isoline can update as time passes, so as the current time moves towards the scheduled time for arrival, the ETA isoline moves towards the destination until it collapses at the destination at the scheduled time of arrival. A zone within the ETA isoline may be coloured green, so that the user can readily see that, if they are within this "on time" zone, they will arrive at the destination on time. Similarly, the zone outside the ETA isoline may be coloured red as a "late zone" so that the user can readily see they need to speed up to catch the ETA isoline boundary in order to arrive on time at the destination. Of course, if the ETA isoline appears very far away from the user's current position, this can also readily be seen and so the user need not tire themself speeding up to meet the ETA isoline if he/she is very unlikely to reach the destination in time anyway. Of course, the marker may be overlain on the current position of the traveller in a different colour, so that a green marker for the current location may mean that the traveller will reach the destination at the required time, whereas a red marker may indicate that the traveller is unlikely to reach the destination in time.

Other examples depicted in the figures have been provided with reference numerals that correspond to similar features of earlier described examples. For example, feature number 100 can also correspond to numbers 200, 300 etc. These numbered features may appear in the figures but may not have been directly referred to within the description of these particular examples. These have still been provided in the figures to aid understanding of the further examples, particularly in relation to the features of similar earlier described examples.

FIG. 1 shows an apparatus 100 comprising memory 107, a processor 108, input I and output O. In this embodiment only one processor and one memory are shown but it will be appreciated that other embodiments may utilise more than one processor and/or more than one memory (e.g. same or different processor/memory types).

In this embodiment the apparatus 100 is an Application Specific Integrated Circuit (ASIC) for a portable electronic device with a touch sensitive display. In other embodiments the apparatus 100 can be a module for such a device, or may be the device itself, wherein the processor 108 is a general purpose CPU of the device and the memory 107 is general purpose memory comprised by the device.

The input I allows for receipt of signalling to the apparatus 100 from further components, such as components of a portable electronic device (like a touch-sensitive display) or the like. The output O allows for onward provision of signalling from within the apparatus 100 to further components such as a display screen. In this embodiment the input I and output O are part of a connection bus that allows for connection of the apparatus 100 to further components.

The processor 108 is a general purpose processor dedicated to executing/processing information received via the input I in accordance with instructions stored in the form of computer program code on the memory 107. The output signalling generated by such operations from the processor 108 is provided onwards to further components via the output O.

The memory 107 (not necessarily a single memory unit) is a computer readable medium (solid state memory in this example, but may be other types of memory such as a hard drive, ROM, RAM, Flash or the like) that stores computer program code. This computer program code stores instructions that are executable by the processor 108, when the program code is run on the processor 108. The internal connections between the memory 107 and the processor 108 can be understood to, in one or more example embodiments, provide an active coupling between the processor 108 and the memory 107 to allow the processor 108 to access the computer program code stored on the memory 107.

In this example the input I, output O, processor 108 and memory 107 are all electrically connected to one another internally to allow for electrical communication between the respective components I, O, 107, 108. In this example the components are all located proximate to one another so as to be formed together as an ASIC, in other words, so as to be integrated together as a single chip/circuit that can be installed into an electronic device. In other examples one or more or all of the components may be located separately from one another.

FIG. 2 depicts an apparatus 200 of a further example embodiment, such as a mobile phone. In other example embodiments, the apparatus 200 may comprise a module for a mobile phone (or PDA or audio/video player), and may just comprise a suitably configured memory 207 and processor 208. The apparatus in certain embodiments could be a portable electronic device, a laptop computer, a mobile phone, a Smartphone, a tablet computer, a personal digital assistant, a digital camera, a navigator, a server, a non-portable electronic device, a desktop computer, a monitor, or a module/circuitry for one or more of the same.

The example embodiment of FIG. 2, in this case, comprises a display device 204 such as, for example, a Liquid Crystal Display (LCD), e-Ink or touch-screen user interface. The apparatus 200 of FIG. 2 is configured such that it may receive, include, and/or otherwise access data. For example, this example embodiment 200 comprises a communications unit 203, such as a receiver, transmitter, and/or transceiver, in communication with an antenna 202 for connecting to a wireless network and/or a port (not shown) for accepting a physical connection to a network, such that data may be received via one or more types of networks. This example embodiment comprises a memory 207 that stores data, possibly after being received via antenna 202 or port or after being generated at the user interface 205. The processor 208 may receive data from the user interface 205, from the memory 207, or from the communication unit 203. It will be appreciated that, in certain example embodiments, the display device 204 may incorporate the user interface 205. Regardless of the origin of the data, these data may be outputted to a user of apparatus 200 via the display device 204, and/or any other output devices provided with apparatus. The processor 208 may also store the data for later use in the memory 207. The memory 207 may store computer program code and/or applications which may be used to instruct/enable the processor 208 to perform functions (e.g. read, write, delete, edit or process data).

FIG. 3 depicts a further example embodiment of an electronic device 300, such as a tablet personal computer, a portable electronic device, a portable telecommunications device, a server or a module for such a device, the device comprising the apparatus 100 of FIG. 1. The apparatus 100 can be provided as a module for device 300, or even as a processor/memory for the device 300 or a processor/memory for a module for such a device 300. The device 300 comprises a processor 308 and a storage medium 307, which are connected (e.g. electrically and/or wirelessly) by a data bus 380. This data bus 380 can provide an active coupling between the processor 308 and the storage medium 307 to allow the processor 308 to access the computer program code. It will be appreciated that the components (e.g. memory, processor) of the device/apparatus may be linked via cloud computing architecture. For example, the storage device may be a remote server accessed via the Internet by the processor.

The apparatus 100 in FIG. 3 is connected (e.g. electrically and/or wirelessly) to an input/output interface 370 that receives the output from the apparatus 100 and transmits this to the device 300 via data bus 380. Interface 370 can be connected via the data bus 380 to a display 304 (touch-sensitive or otherwise) that provides information from the apparatus 100 to a user. Display 304 can be part of the device 300 or can be separate. The device 300 also comprises a processor 308 configured for general control of the apparatus 100 as well as the device 300 by providing signalling to, and receiving signalling from, other device components to manage their operation.

The storage medium 307 is configured to store computer code configured to perform, control or enable the operation of the apparatus 100. The storage medium 307 may be configured to store settings for the other device components. The processor 308 may access the storage medium 307 to retrieve the component settings in order to manage the operation of the other device components. The storage medium 307 may be a temporary storage medium such as a volatile random access memory. The storage medium 307 may also be a permanent storage medium such as a hard disk drive, a flash memory, a remote server (such as cloud storage) or a non-volatile random access memory. The storage medium 307 could be composed of different combinations of the same or different memory types.

FIGS. 4a-4b illustrate an example of output 400 provided by an apparatus as depicted in FIGS. 1, 2 and 3. The output may be provided using the display of a portable electronic device such as a mobile phone, smartphone or tablet computer, for example. The user of the device has entered a destination which they wish to reach at a particular time to catch a train.

Display screen 400 shows a map application 402 displaying a region around the chosen destination "Unter den Linden" 404, 406. The display shows a first region 408 around the destination 406 labelled "Catching train ok", and a second region 410 outside the first region 408 labelled "Missing the train". The boundary 412 between the two regions 408, 410 may be considered an ETA isoline. A user wishes to reach the destination 406 at a particular time (to catch a train). If the user is located on the ETA isoline 412 or within it in the first region 408, then they will arrive in time to catch their train as planned. If the user is located outside the ETA isoline 412 in the second region 410, they must speed up to catch the ETA isoline 412 (or move beyond it into the first region 408) in order to catch their train. The ETA isoline 412 represents a distance away from the train station, and may be determined using a speed of the traveller (e.g., a preset or determined average walking speed) and the time between the current time and the time at which the train departs.

Thus the ETA isoline 412 provides a visual cue to the user that the user must be located at or within its boundaries in order to arrive at the train station on time to catch the train. As time progresses, as shown in FIG. 4b, the ETA isoline 412 gradually moves in 414 towards the destination 408 until at the scheduled train departure time, the ETA isoline 412 with collapse to a point at the destination 406.

The displayed output in FIGS. 4a and 4b is obtained via the apparatus which is configured to provide at least one marker (in this case, the ETA isoline 412 and/or the zones 408, 410) to indicate, on a map 402, the required current position in a planned journey to reach a destination 406 of the planned journey according to a predetermined time criterion (the time at which the train leaves the station).

The displayed destination in this example is an intermediate destination of a planned journey, as the user needs to go on to catch a bus after they alight from the train. Thus the apparatus is configured such that the predetermined time criterion (time of departure of the train at the train station 406) is set to allow for a predetermined travel connection (catch the later bus after alighting from the train) to be made within the planned journey.

In other examples, the destination may be the ultimate destination of the planned journey and no further travel may be planned in that journey.

The predetermined time criterion used by the apparatus to calculate the location of the ETA isoline 412, for example, is based on the time at which the user's train departs from the station based on a train timetable. This time criterion may be considered an originally calculated estimated time of arrival. In other examples, the apparatus may be in communication with a real-time travel information system and may be able to update the displayed ETA isoline based on the real-time train travel information. For example, if the user's train is delayed by 20 minutes, this information may be used by the apparatus to update the displayed ETA isoline 412 and provide an additional 20 minutes for the user to reach the train station. The ETA isoline 412 would therefore be moved out from the destination 406 providing a larger first region 408 which the user may be located within and still catch the train.

FIG. 4c illustrates a public transport travel planner displayed on an electronic device. The public transport travel planner shows that the user has planned a journey from Marmara Manhattan 452 to the Sidewalk Café 454. The user wishes to arrive in a time window between 13:00 and 13:15. The travel planner shows three possible journeys 456, 458, 460 which the user may take to arrive in their chosen time window. The apparatus is able to take the times and locations of the scheduled public transport required for the journey from the travel planner and show each on a map as an ETA isoline (or other marker) for the user to see quickly and easily whether he/she will catch the bus/tram on time. The user may be able to, for example, select one of the three displayed journeys 456, 458, 460 and the apparatus show an ETA isoline or other marker for the relevant stage of that particular journey. The relevant stage may be determined by the current time and/or current location of the user, for example.

FIG. 5 illustrates an example of output 500 provided by an apparatus as depicted in FIGS. 1, 2 and 3. The output may be provided using the display of a portable electronic device/ apparatus such as a mobile phone, smartphone, navigator or tablet computer. The user of the device has entered a destination 504 which they wish to reach at a particular time for a scheduled meeting. The user's current position 502 is shown on the map 506 along with their planned destination 504.

The device is providing relevant information 508 to the user concerning their planned journey, including the ETA (18 minutes), the distance to travel (0.7 miles) and the method of transport (the method of travel by foot is highlighted, but the relevant information 508 could be updated if the user selected the travel by car option, which would highlight the car icon).

The map shows a route 510 between the starting point 502 and destination 504. This route can be provided in a different colour depending on whether the user is going to reach the destination 504 at the scheduled time or not. For example, the current time is 12.23 512. If the meeting is scheduled for 12:30, the user has 7 minutes to reach the destination 504. Since the journey will take 18 minutes, the route 510 may be shown in red to illustrate that the user is unlikely to arrive at the destination 504 in time for the meeting at 12:30. If the meeting was scheduled for 13:00, the user has 37 minutes to arrive on time but the journey will take only 18 minutes. Thus the route 510 may be shown in green to illustrate that the user will arrive at the destination 504 in time for the meeting. Of course, instead of using colours, the marker may change appearance in a different way, for example by having a different shape, by flashing, by changing shading or highlighting, or changing size.

If the meeting was scheduled for 12:45, then the user has 22 minutes to arrive on time. The apparatus may account for a travel time margin either side of the scheduled arrival time, if it appears the user will arrive on time but without much time to spare, or will arrive just after the scheduled time. The travel time margin may be, for example, five minutes before and after the scheduled time. Since the journey will take 18 minutes, which is within a travel time margin of five minutes of 22 minutes, the route 510 may be displayed in amber to show that the user may arrive on time but they will not have much time to spare. If the route is shown in red, and the user runs for part of the journey rather than walks, then the user may gain time and the displayed route may change from red (through amber) to green if the user moves to a destination quickly enough to allow him/her to arrive on time.

The colour (or other differential marking) of the displayed route provides a quick and readily understandable representation to the user of whether or not he/she will arrive on time. The user need not look at the current time and ETA and calculate whether or not they are likely to arrive on time, as the apparatus determines this and displays it on the map as a marker (in this case, a coloured line along the route). As time progresses and the user moves along the route towards their destination, the route marked on the map may update to show the route between the user's latest/current location and the destination 504. This way if the user takes a wrong turn the map can update to reflect this, the route may be re-plotted and the ETA marker colour can be updated accordingly.

FIGS. 6a-6e each show some different ways in which the at least one marker may be provided to a user to indicate on a map the required current position in a planned journey to reach a destination of the planned journey according to a predetermined time criterion. Each of the FIGS. 6a-6e illustrates a map 600 with a route marked from a start position 602 to an end position 604, which in this example is a bus stop. The user is walking from the start 602 to the end 604.

Figure 6A:
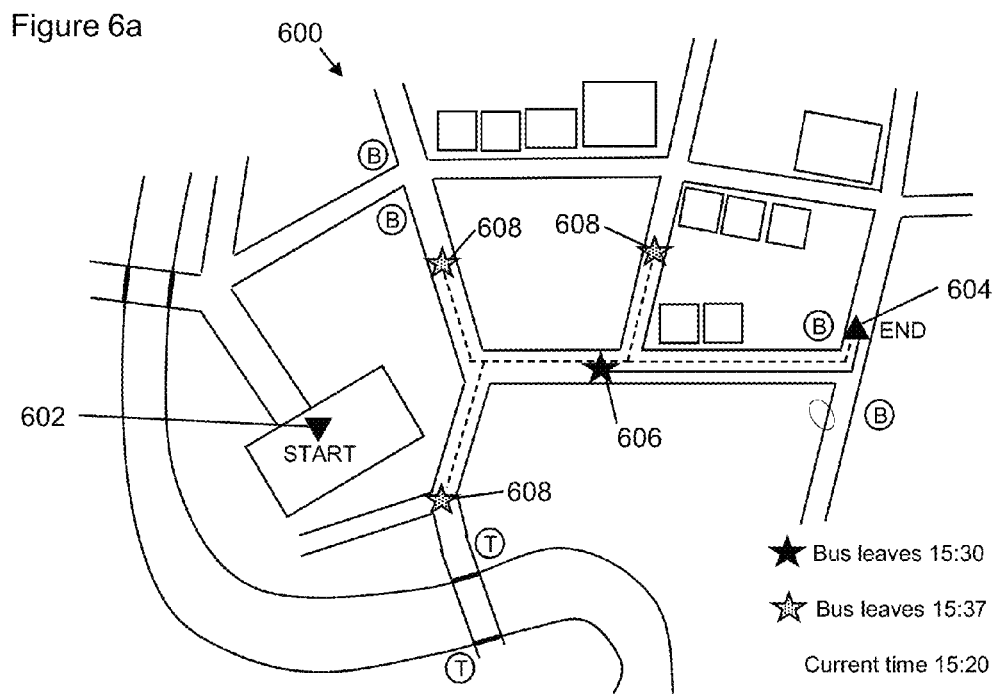
FIGS. 6a-6e illustrate different ways in which a marker may be provided on a map to show a required current position with respect to a bus stop destination for reaching that bus stop by a particular bus departure time according to the present disclosure.

FIG. 6a shows two series of point markers 606, 608, each series corresponding to a departure time for a bus leaving from the bus stop 604. The current time is 15:20. The marker 606 shows one position which the traveller must be at in order to just be in time to catch the 15:30 bus from the bus stop 604. Thus the marker 606 shows a position which is 10 minutes walk away from the bus stop 604.

The three markers 608 each show a position which the traveller must be at in order to just be in time to catch the 15:37 bus from the bus stop 604. Thus the markers 608 each show a position which is 17 minutes walk away from the bus stop 604. Since the second bus leaves seven minutes later than the first bus, the traveller can afford to be further away from the bus stop 604 and still arrive at the stop 604 in time to catch the second bus. Generally, if the user is anywhere along the route between a particular marker 606, 608 and the bus stop 604, then they will arrive at the bus stop with time to spare before catching the relevant bus.

Figure 6B:
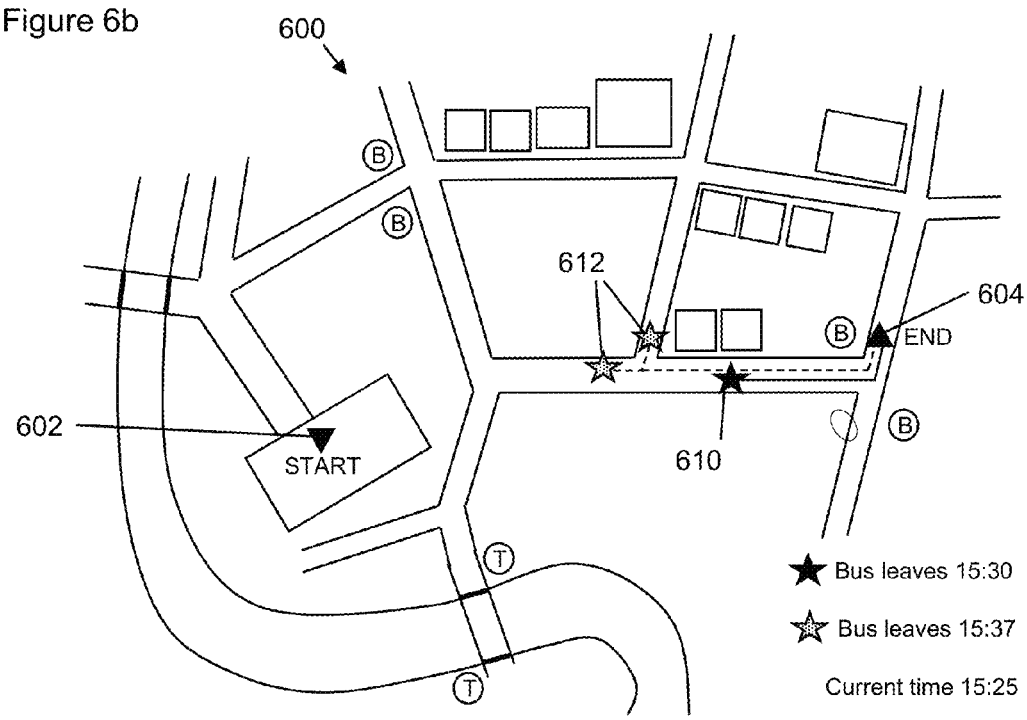

FIG. 6b follows from FIG. 6a, and shows that the current time is now 15:25, five minutes later than in FIG. 6a. Therefore the markers showing where the user needs to be in order to just catch a particular bus have moved closer to the bus stop 604. To catch the bus leaving at 15:30, the user must be at the point shown by the marker 610 or between this marker 610 and the bus stop 604. The marker 610 is a five minute walk away from the bus stop. To catch the bus leaving at 15:37, the user must be at the points shown by the markers 612 or between one of these markers 612 and the bus stop 604. The markers 612 are each a 12 minute walk away from the bus stop.

Figure 6C:
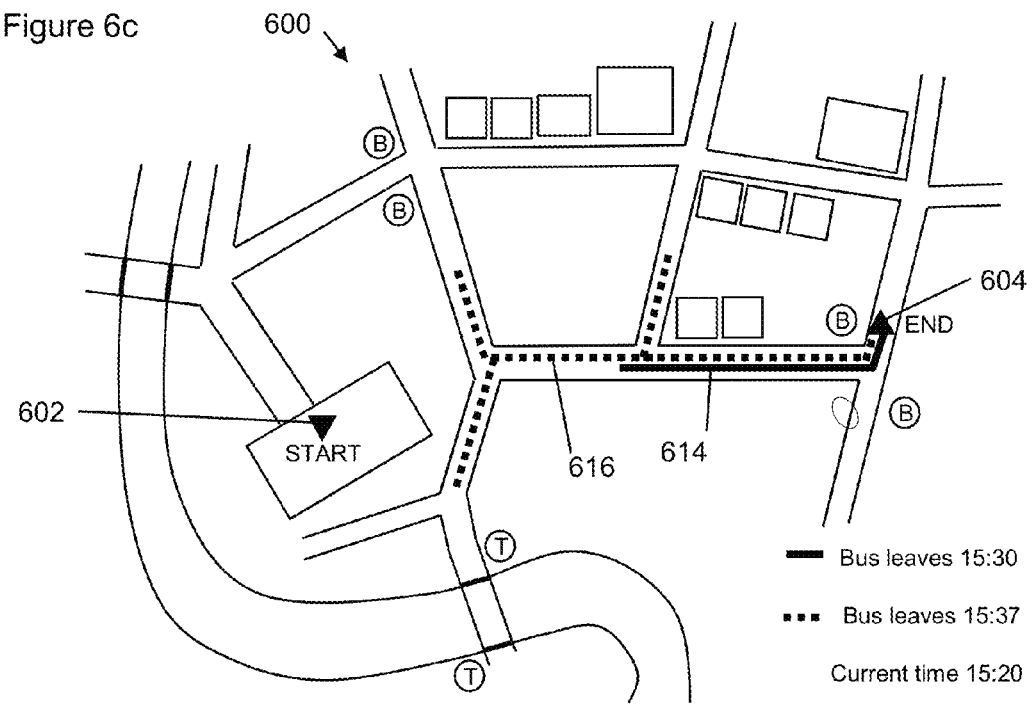

FIG. 6c shows two series of line markers, each corresponding to a route along which a user must be in order to be on time to catch the corresponding bus from the bus stop 604. Each line 614, 616 provides an indication of the likelihood of reaching the destination according to the predetermined time criterion (the time at which the bus is due to leave the stop 604). The current time is 15:20. The line marker 614 shows one route which the traveller must be on to be in time to catch the 15:30 bus from the bus stop 604. The line marker 616 shows another series of possible routes which the traveller must be on to be in time to catch the 15:37 bus from the bus stop 604. If the user is outside one of the marked routes, he/she must speed up so that they are located on one of the routes otherwise they will miss the corresponding bus.

Figure 6D:
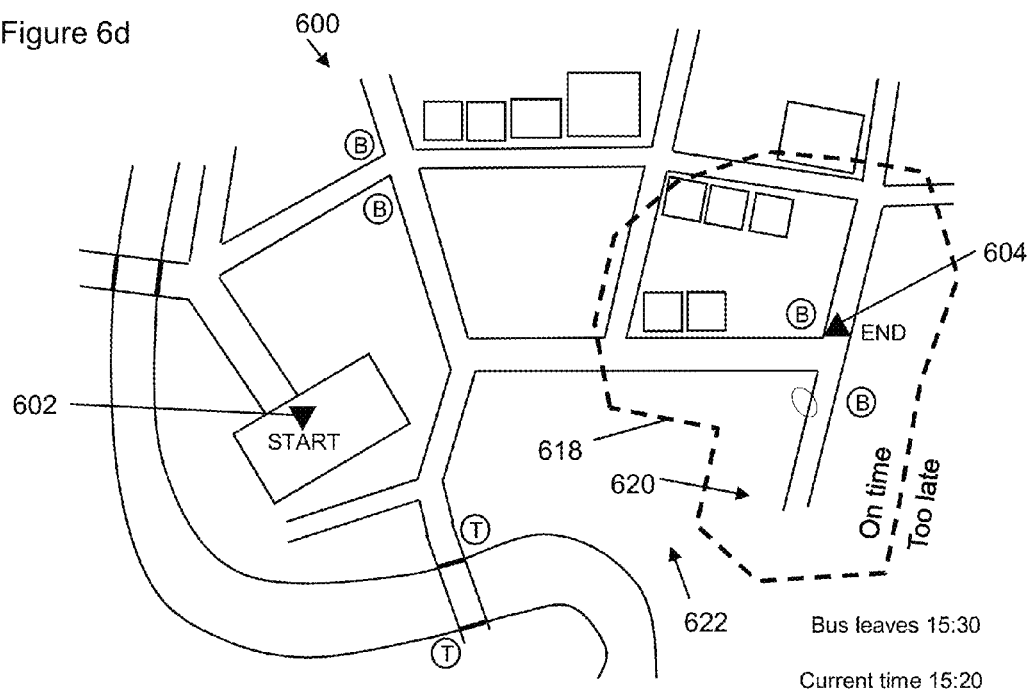

FIG. 6d shows a zone marker 618 which may be considered as an ETA isoline on the map. From this marker 618 the user can see whether or not they will be on time arriving at the bus stop 604 to catch the 15:30 bus. The current time is 15:20 and the bus is scheduled to leave at 15:30, and so the zone marker shows a perimeter which is 10 minutes walk away from the bus stop 604. Within the zone marker in the first region 620, the user will arrive at the bus stop with time to spare. If the user is located outside the zone marker in the second region 622, then he/she will miss the 15:30 bus unless he/she speeds up to be located within the zone marker 618. As time passes the zone marker 618 will move towards the bus stop 604 until at 15:30 the zone marker will just disappear at the location marked by the bus stop 604.

In some examples, there may be a series of multiple zone markers, for example as concentric-type boundaries, each corresponding to a bus scheduled to leave from the bus stop 604 at a different time. Buses which leave later will have a corresponding zone marker shown further from the bus stop 604 (and the zones would be marked/labelled accordingly). In this way, if a user does not want to speed up to reach a particular bus, the user can at least see at what time a bus will arrive once they have got to the bus stop 604. In this example, if a user either needs to speed up to gain two minutes and catch a first bus, or alternatively wait half an hour for the next bus, they may choose to speed up and avoid the half hour wait. Thus, each zone provides an indication of the likelihood of reaching the destination (the bus stop 604) according to the predetermined time criterion (the time scheduled for the bus to leave the stop 604).

Figure 6E:
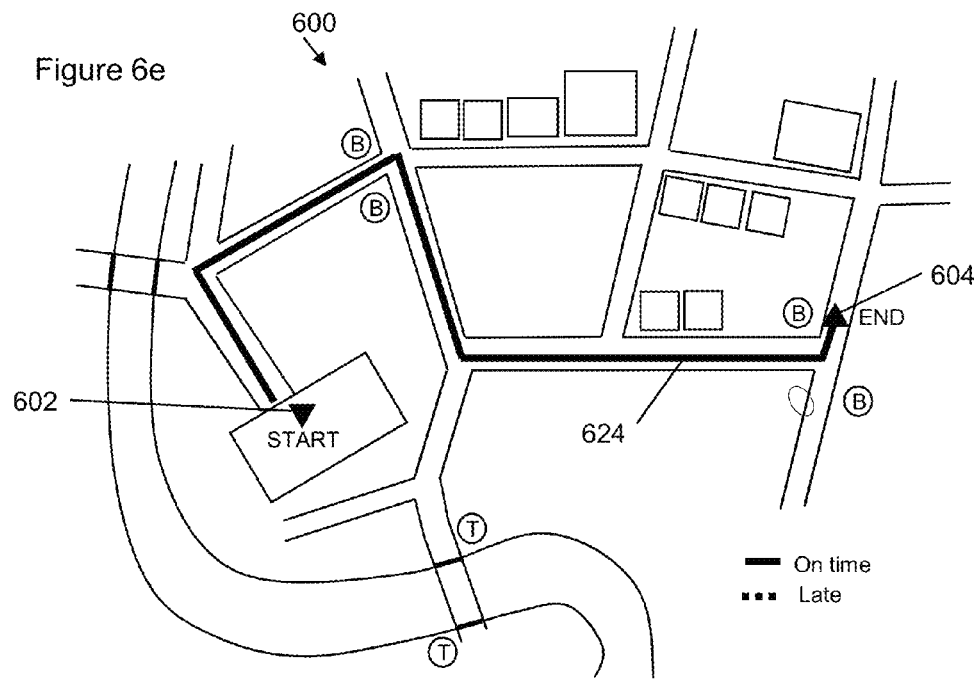

FIG. 6e shows a line marker 624 in a similar way to that shown in FIG. 5. The entire route from the start of the user's journey to the bus stop is shown. If the user is on time to reach the bus stop and catch a particular bus, the route 624 may be shown in green indicating a strong likelihood of reaching the destination within the predetermined time criterion. If the user is going to be late the route 624 may be shown in red indicating a strong likelihood of reaching the destination outside the predetermined time criterion. If the user is just on time within a particular margin, the route 624 may be shown in amber indicating an intermediate likelihood of reaching the destination within the predetermined time criterion.

Thus each of the examples in FIGS. 6a-6e shows examples of respective markers, which are a point marker, a line marker, and a zone marker. The marker provides an indication of the required current position in the planned journey to reach the destination 604 according to the predetermined time criterion (the time the bus is due to leave the stop 604).

FIGS. 7a-7d illustrate an example of a portable electronic device 700 which is (or comprises) an apparatus such as that depicted in FIGS. 1, 2 and 3. The output is provided using the display of the portable electronic device 700. The device 700 may be a mobile phone, smartphone, tablet computer or navigator, for example.

Figure 7A:
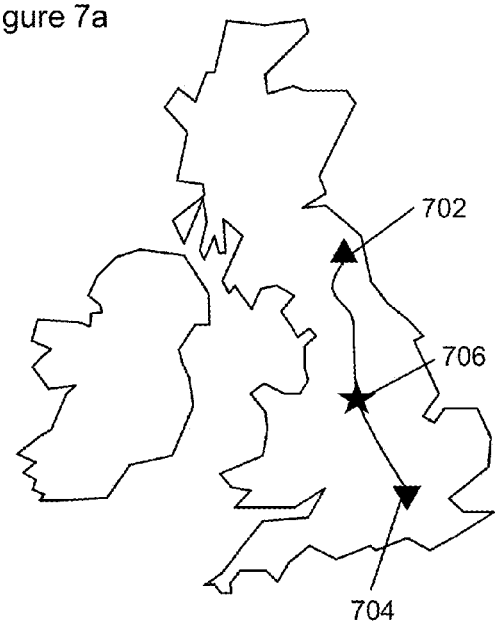
FIGS. 7a-7d illustrate different ways in which a marker may be provided on a map to show a required current position of a user for reaching a destination by a particular time according to the present disclosure.

The user of the device in this example has planned a long car journey from London 704 to Newcastle 702 in the UK, as indicated on the schematic map of FIG. 7a. The map views shown in FIG. 7b-7d relate to the current location and surroundings of the user. Since the user has a long way to travel, and the apparatus 700 is being used as a portable navigation system, the zoom level used will not show the ultimate destination of Newcastle 702 until the user is almost at that destination. If the zoom level of the map was sufficient to show both the user's current location and the ultimate destination, as indicated in FIG. 7a, it would not be possible to see any details at a suitably zoomed-in scale to help with the journey, such as the structure of road junctions and roundabouts, and points of interest along the journey such as service stations. Thus in this example, any markers are indicated with respect to the location of the user rather than in relation to the destination. The user's current location is indicated by a marker 706 on FIG. 7a, and shows the user is relatively far way from both the starting location 704 and the destination 702.

Figure 7B:
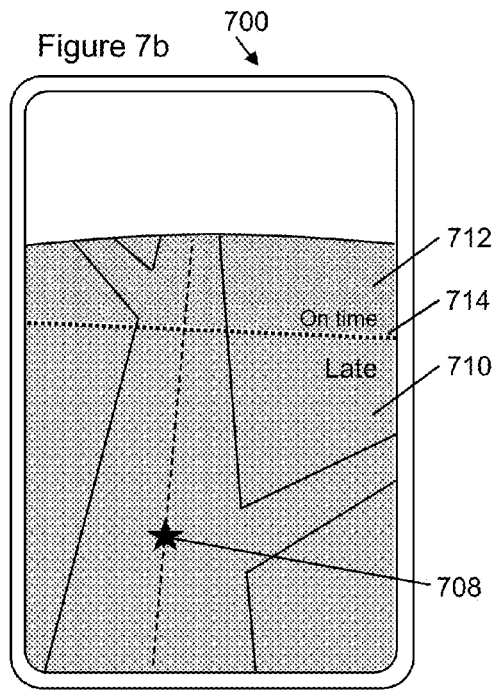

FIG. 7b shows the user's view of the display of the apparatus 700 while driving. The user wishes to arrive in Newcastle at a particular time. From the user's current location, current distance away from the destination 702, and a measure of the user's speed, the apparatus can determine whether or not the user will arrive at the destination 602 on time. Currently, as shown by the user indicator 708 in the "late" zone 710, the user will not arrive on time. If the user manages to speed up or gain ground, and enter the "On time" zone 712, then he/she will reach the destination 702 on time. If he/she reaches the boundary 714 between the two zones, he/she will just arrive at their destination 702 on time.

Figure 7C:
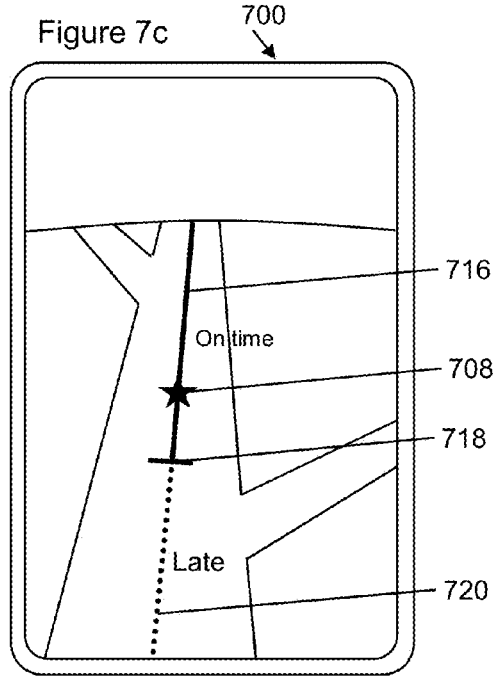

FIG. 7c shows the marker as a line 716 which indicates the user will arrive on time, and beyond a point 718 of the line 716, the user will be late in arrival as shown by the late marker 720. The user is shown as currently due to arrive in time for their scheduled time of arrival, as their position marker 708 is on the "On time" line marker 716.

Figure 7D:
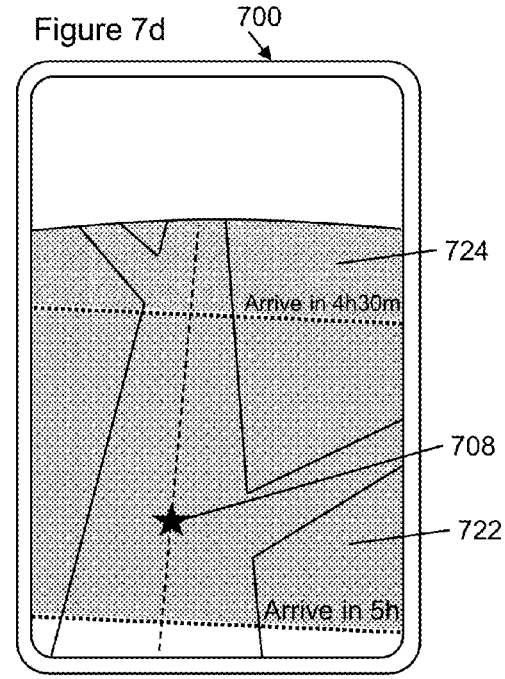

FIG. 7d shows zone markers as ETA isolines and corresponding ETA zones. The user's current location marker 708 is shown in the "Arrive in 5 hours" zone 722. If the user speeds up they may move so that they are located in the "arrive in 4 hours 30 minutes" zone 724. The user may therefore readily judge at what time they are scheduled to arrive at the destination without any calculation. The separation of the zone boundaries in this example is half an hour, but could be any value and may be set by the user.

The apparatus in this example is configured to dynamically update the one or more markers during the planned journey based on a current speed of the traveller, the cumulative distance travelled by the traveller, the travel distance left for the traveller to reach the destination and current traffic messaging for the planned journey. For example, if the user slows down such that they will arrive late, then the line markers in FIG. 7c will dynamically change to show, for example, a red line marker rather than a green marker. If current traffic messaging is considered by the apparatus, then for example if slow moving traffic is announced for a part of the route, the zone boundary marker 714 may move further from the user's current location to indicate that, to arrive on time, the user must try and speed up to compensate for the announced slow moving traffic which they will reach soon. Other example markers include 3D markers, for example a 3D representation of a signpost, landmark or route shown using 3D mapping and navigation applications/services.

Figure 8A:
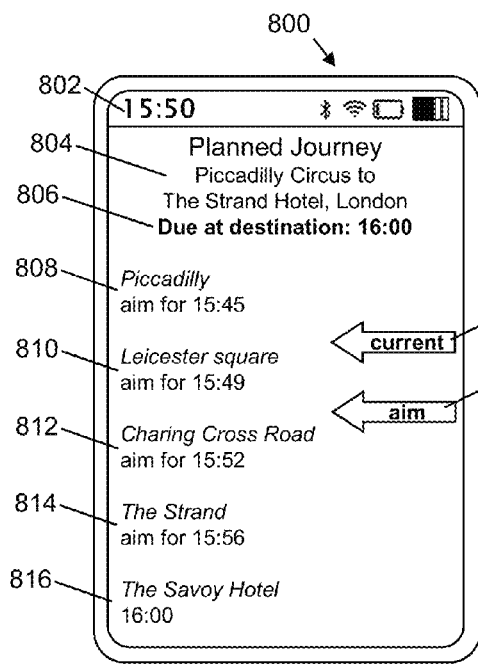
FIGS. 8a-8b illustrate example embodiments of text markers provided to show a required current position with respect to a planned journey.
Figure 8B:
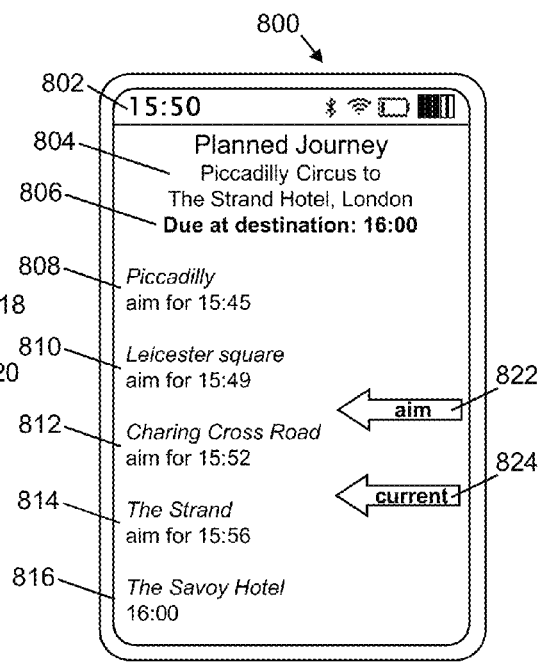

FIGS. 8a and 8b illustrate an example of a portable electronic device 800 which is (or comprises) an apparatus such as that depicted in FIGS. 1, 2 and 3. The output is provided using the display of the portable electronic device 800. The apparatus/device 800 is displaying a planned journey in text from Piccadilly Circus to the destination of The Savoy Hotel, in London. The user has an appointment to meet a friend at 16:00 at The Savoy Hotel.

The apparatus/device 800 is displaying a summary of the journey 804 and the due time for arrival at the destination 806 as 16:00. The apparatus/device 800 has calculated that, for the user to arrive at the planned destination at 16:00, they need to leave their starting point of Piccadilly Circus at 15:45 808. The planned journey route requires the user be at Leicester Square at 15:49 810, Charing Cross Road at 15:52 812, The Strand at 15:56 814 and finally The Savoy Hotel at 16:00 816. The current time is 15:50 as shown on the device clock 802. The apparatus/device 800 is displaying a text marker 820 showing at what point in the planned journey the user should be in order to arrive at the destination at 16:00. In this case, the user currently needs to be between Leicester Square and Charing Cross Road in order to arrive on time at The Savoy Hotel. As time passes, the marker 820, 824 indicating where the user needs to be in the journey in order to arrive at the destination by 16:00 moves down the text list and will reach the "Savoy Hotel" listing 816 at 16:00.

In FIG. 8a, the user is running late, and has a current position between Piccadilly and Leicester Square (as determined, for example, using GPS functionality of the apparatus/device 800). The current position of the user in the displayed planned journey is indicated by a text marker 818 and an arrow. The user can readily see that they are running behind schedule, as the current position marker 818 is behind the marker 820 indicating where the user needs to be. The user needs to hurry up so that the "current" text marker 818 reaches the "aim" text marker 820, in order to arrive at the destination on time.

In FIG. 8b, the user is ahead of schedule, at a current position between Charing Cross Road and the Strand. The current position of the user in the displayed planned journey is indicated by a text marker 824 and an arrow. The user can readily see that they are running ahead of schedule, as the current position marker 824 is ahead of the marker 822 indicating where the user needs to be. As long as the current position marker 824 is ahead of the marker 822, the user knows they will arrive on time.

The text markers 820, 824 therefore provide an indication of the required current position in a planned journey 804 to reach a destination 816 according to a predetermined time criterion 806.

This embodiment may provide advantages to the user by not only indicating in a readily understandable format whether the user is on schedule or not, but also by showing the stages along the planned journey for the user. The user may find it easier to navigate using a text-based list of landmarks (such as buildings, street names, and tube stations) than using a map. In other examples, directions and/or photographs of the listed landmarks may be included in the display to help the user navigate. If the user is behind schedule as shown in FIG. 8a, the text marker 818 may be displayed in red to indicate the user will be late. If the user is ahead of schedule as shown in FIG. 8b, the text marker 824 may be displayed in green to indicate the user will arrive in time. In variations without a text marker, the arrows could just be different colours or shapes without necessarily using text. Such arrows could be considered point/graphical markers.

In other examples, the displayed information may provide a text based marker such as a message reciting the next location in the journey that the user must reach, and by what time. For example, in relation to FIG. 8a, a text marker may read "speed up to reach Charing Cross Road by 15:52", because this point in the journey is the next one to be reached by the marker 820 indicating that the user will just arrive in time. If at 15:52, the user is not yet at Charing Cross Road, the text marker may change to read "speed up to reach the Strand by 15:56". In the case where the user is ahead of schedule as in FIG. 8b, a text marker message may read "next location— The Strand at 15:56" as this location is the next one in the journey to be reached by the user. In other examples still, the text marker may read "speed up", "OK", "time to spare" or "can slow down" to textually indicate whether the pace of travel needs to change to reach a destination according to the predetermined travel criterion. In certain further embodiments, the text markers could be displayed on a map itself, or at least associated with a map (e.g., positioned adjacent to a map of the planned journey).

Figure 9:
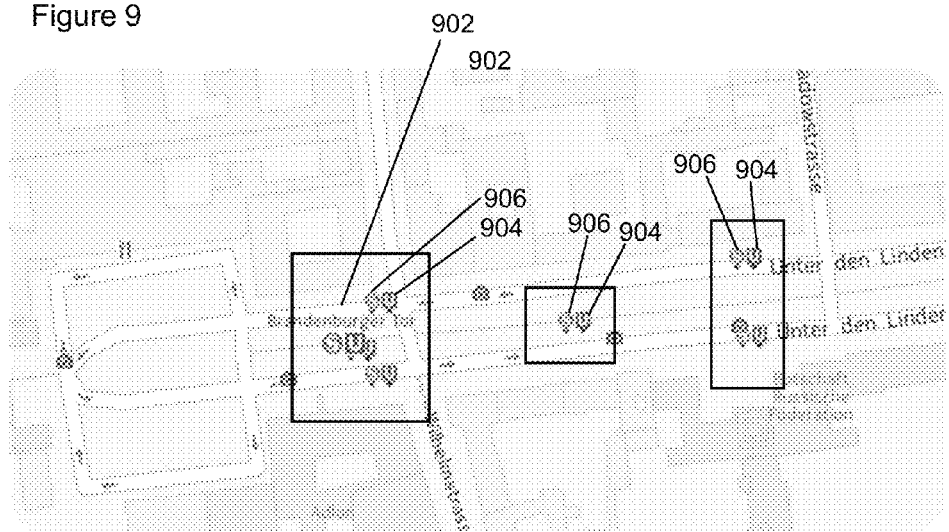
FIG. 9 illustrates a map of a public transport station with different entrances/exits.

FIG. 9a illustrates a map showing the Brandeburg Gate train/underground station along with the gates which provide access to the train station 906 and gates which provide access to the underground station 904. The apparatus may take into account the positioning of entrances to public transport stations when calculating whether or not the user will arrive at the station in time. Thus the apparatus can account for public transport stations having multiple entrances for different types of public transport (train, underground) at a single station. The markers provided to indicate the required current position in a planned journey to reach a destination according to a predetermined time criterion may be therefore determined whilst accounting for, for example, an additional five minute part of the journey which is required to reach the necessary gate, entrance or train platform within the station.

In certain examples, the apparatus can provide the markers while taking into account delay messaging for the planned journey, and received public transport messaging concerning changes in the predetermined time criterion. For example, if there is a news feed or other subscription/update service which provides information on current travel information, delays, and cancelled train services, the apparatus can use this so that, for example, a user does not rush to catch a train which is 30 minutes late departing. Further the apparatus can use received messaging concerning changes in the predetermined time criterion to amend the marker positions. Thus if a user is travelling to arrive at a concert scheduled to start at 21:00, and their friend calls to say that there is a pre-performance warm up just announced for 20:00, then the user can, part way through their journey, enter the new time criterion of 20:00 rather than 21:00 and see, using the updated markers, if they are able to arrive in time. Thus the planned journey may be variable during travel along the planned journey. In other examples the planned journey may be fixed after the start of travel along the planned journey.

In certain examples, the apparatus may be configured such that at least one of the predetermined time criterion, the destination, and the planned journey, is based on received time and/or location indications from a calendar application. For example, a user may be walking in town to an appointment which is stored in the user's calendar. The apparatus may be configured to access the user's calendar, determine a location (e.g. Moor Lane Dental Surgery, Plymouth) and a scheduled time (14:00) and use these to plot a route, or at least show the destination, on a map and provide markers to the user on a map indicating whether he/she will arrive in time for his/her appointment. If the user needs to travel via his/her house prior to the appointment, thus requiring a particular route, this may also be taken into account when providing the markers.

Generally, the predetermined time criterion by which a user should be at a particular location may be set by a user (for example via a user-entered calendar entry, or simply entered by the user when planning the route), or may be based on an automatic calculation by an apparatus (for example, by accessing a train timetable, and travel update information, and calculating a required time of arrival automatically).

In certain examples, the markers may be indicated in relation to a planned journey which is at least partly indoors. For example, a user may wish to meet a friend in a shopping centre at a predetermined time, and the user may have a plan of the shopping centre available on a portable electronic device. Markers, as discussed herein, may be included on the plan to show whether or not the user will meet her friend on time or not. Other indoor locations to which aspects of this disclosure may apply include airports, train and subway stations, educational buildings, office buildings, and generally buildings/indoor locations which may take more than a short amount of time (for example, 1-2 minutes) to move through.

In certain examples one or more markers may be displayed to a user on a map using an electronic device (such as a smartphone or tablet computer) comprising a direction-determining device (such as a compass or magnetometer). As the device changes orientation, as detected by the direction-determining device, the displayed map and displayed one or more markers may also rotate and/or change appearance. One advantage may be that the user is presented with an enhanced view of a map with markers which represents what they may see in the real world. A further advantage may be that the markers are determined according to the current direction in which the user (and the user's electronic device) is facing. For example, if the user is driving, then the apparatus may be able to account for one-way road traffic systems such that markers may be presented differently depending if the user is facing one way or another.

In certain examples, one or more markers may be displayed on a map as discussed herein which is provided to a user in an augmented reality view. For example, a zone marker may be shown on an augmented reality map, so that a user may be able to see an electronic representation of a current real life location on the augmented reality map including the zone marker. An augmented reality view may comprise an electronic image corresponding to an image or images of a current location, or may for example be presented in a "heads-up" type overlay display to a user.

In certain examples, at least one marker may be provided as a way of warning a user that they may not reach a particular destination in time. For example, a user may be climbing a mountain and needs to reach a planned rest point (such as a cabin) by sunset. The apparatus may be configured to provide at least one marker to the user indicating that they will not reach the rest point in time so that the user can turn back before being in a dangerous situation (i.e., on a mountain without shelter after sunset). The apparatus may have access to sunrise/sunset times and use these as predetermined time criteria. Another example is that the apparatus may have access to high tide and low tide times for a particular location, which may be useful to a user sailing a boat.

FIG. 10a shows an example of an apparatus in communication with a remote server. FIG. 10b shows an example of an apparatus in communication with a "cloud" for cloud computing. In FIGS. 10a and 10b, apparatus 1000 (which may be apparatus 100, 200 or 300) is in communication with a display 1002. Of course, the apparatus 1000 and display 1002 may form part of the same apparatus/device, although they may be separate as shown in the figures. The apparatus 1000 is also in communication with a remote computing element. Such communication may be via a communications unit, for example. FIG. 10a shows the remote computing element to be a remote server 1004, with which the apparatus may be in wired or wireless communication (e.g. via the internet, Bluetooth, a USB connection, or any other suitable connection as known to one skilled in the art). In FIG. 10b, the apparatus 1000 is in communication with a remote cloud 1010 (which may, for example, by the Internet, or a system of remote computers configured for cloud computing). It may be that the determination of the marker placement is performed at the remote computing element 1004, 1010) and accessed by the apparatus 1000 for display 1002. The apparatus 1000 may actually form part of the remote sever 1004 or remote cloud 1010. In such examples, determination of the one or more markers for provision on a map for indicate to a user may be conducted by the server or in conjunction with use of the server.

FIG. 11 illustrates a method according to an example embodiment of the present disclosure. The method comprises the step of providing at least one marker to indicate, on a map, the required current position in a planned journey to reach a destination of the planned journey according to a predetermined time criterion 1100.

FIG. 12 illustrates schematically a computer/processor readable medium 1200 providing a program according to an embodiment. In this example, the computer/processor readable medium is a disc such as a Digital Versatile Disc (DVD) or a compact disc (CD). In other embodiments, the computer readable medium may be any medium that has been programmed in such a way as to carry out the functionality herein described. The computer program code may be distributed between the multiple memories of the same type, or multiple memories of a different type, such as ROM, RAM, flash, hard disk, solid state, etc.

Any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

Any mentioned apparatus/elements/processor may have other functions in addition to the mentioned functions, and that these functions may be performed by the same apparatus/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to example embodiments thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus, the apparatus comprising:
   at least one processor; and
   at least one memory including computer program code,
   the at least one memory and the computer program code configured, with the at least one processor, to cause the apparatus to perform at least the following:
   provide at least one marker to indicate the required current position in a planned journey to reach a destination of the planned journey according to a predetermined time criterion, wherein the predetermined time criterion is based on a time a user wishes to reach the destination.

2. The apparatus of claim 1, wherein the apparatus is configured such that the predetermined time criterion is at least one of:
   a discrete time which is set to reach the destination by the set discrete time; and
   a time range which is set to reach the destination within the set time range.

3. The apparatus of claim 1, wherein the apparatus is configured such that the destination is at least one of the ultimate destination of the planned journey and an intermediate destination of the planned journey.

4. The apparatus of claim 1, wherein the apparatus is configured such that the predetermined time criterion is set to allow the destination to be reached within an originally calculated estimated time of arrival at the destination.

5. The apparatus of claim 1, wherein the apparatus is configured such that the predetermined time criterion is set to allow for a predetermined travel connection to be made within the planned journey.

6. The apparatus of claim 5, wherein the predetermined travel connection is a connection with at least one of public and private transport connections.

7. The apparatus of claim 1, wherein the apparatus is configured such that at least one of:
   the predetermined time criterion;
   the destination; and
   the planned journey,
is based on received time and/or location indications from a calendar application.

8. The apparatus of claim 1, wherein the apparatus is configured such that the predetermined time criterion is set by at least one of a user, and an automatic calculation by an apparatus to reach the destination by a required time.

9. The apparatus of claim 1, wherein the at least one marker is:
   a point marker;
   a line marker;
   a zone marker; or
   a text marker
the marker providing the indication of the required current position in the planned journey to reach the destination according to the predetermined time criterion.

10. The apparatus of claim 1, wherein the at least one marker provides one or more lines, each line providing an indication of the likelihood of reaching the destination according to the predetermined time criterion.

11. The apparatus of claim 1, wherein the at least one marker provides one or more zones, each zone providing an indication of the likelihood of reaching the destination according to the predetermined time criterion.

12. The apparatus of claim 11, wherein the zones are color coordinated with at least one color from the group: red, amber, and green;
   red indicating a strong likelihood of reaching the destination outside the predetermined time criterion;
   amber indicating an intermediate likelihood of reaching the destination within the predetermined time criterion; and
   green indicating a strong likelihood of reaching the destination within the predetermined time criterion.

13. The apparatus of claim 1, wherein the apparatus is configured to provide the at least one marker by calculating the required current position in a planned journey to reach the destination of the planned journey according to the predetermined time criterion.

14. The apparatus of claim 1, wherein the apparatus is configured to provide the at least one marker by outputting for display the required current position in a planned journey to reach the destination of the planned journey according to the predetermined time criterion.

15. The apparatus of claim 1, wherein the apparatus is configured such that the predetermined time criterion is at least one of:
   set at the outset of the planned journey; and
   updatable during the planned journey.

16. The apparatus of claim 1, wherein the apparatus is configured to dynamically update the one or more markers during the planned journey based on one or more of:
   a current speed of the traveler;
   the cumulative distance travelled by the traveler;
   the travel distance left for the traveler to reach the destination;
   current traffic messaging for the planned journey;
   delay messaging for the planned journey;
   received messaging concerning changes in the predetermined time criterion; and
   received public transport messaging concerning changes in the predetermined time criterion.

17. The apparatus of claim 1, wherein the planned journey is one of:
   variable during travel along the planned journey; and
   fixed after the start of travel along the planned journey.

18. The apparatus of claim 1, wherein the apparatus is configured to update the planned journey based on at least one of:
   traveller deviations from the planned journey; and
   current traffic messaging for the planned journey.

19. A computer program product comprising at least one non-transitory computer-readable storage medium having computer-executable program code instructions stored therein, the computer-executable program code instructions comprising program code instructions to:
   provide at least one marker to indicate the required current position in a planned journey to reach a destination of the planned journey according to a predetermined time criterion, wherein the predetermined time criterion is based on a time a user wishes to reach the destination.

20. A method comprising:
   with a processor of a device, providing at least one marker to indicate the required current position in a planned journey to reach a destination of the planned journey according to a predetermined time criterion, wherein the predetermined time criterion is based on a time a user wishes to reach the destination.

* * * * *

UNITED STATES PATENT AND TRADEMARK OFFICE
CERTIFICATE OF CORRECTION

PATENT NO. : 9,002,640 B2
APPLICATION NO. : 13/709760
DATED : April 7, 2015
INVENTOR(S) : Beaurepaire et al.

It is certified that error appears in the above-identified patent and that said Letters Patent is hereby corrected as shown below:

In the claims:

Column 18,
Lines 66 and 67, "provide at least one marker to indicate the required current position" should read --calculate a required current position--.

Column 19,
Line 3, "destination." should read --destination; and
    cause provision of at least one marker on a map to indicate the calculated required current position in the planned journey to reach the destination of the planned journey according to the predetermined time criterion.--.

Column 20,
Lines 47 and 48, "provide at least one marker to indicate the required current position" should read --calculate a required current position--;
Line 51, "destination." should read --destination; and
    cause provision of at least one marker on a map to indicate the calculated required current position in the planned journey to reach the destination of the planned journey according to the predetermined time criterion.--;
Lines 53 and 54, "providing at least one marker to indicate the required current position" should read --calculating a required current position--;
Line 58, "destination." should read --destination; and
    causing provision of at least one marker on a map to indicate the calculated required current position in the planned journey to reach the destination of the planned journey according to the predetermined time criterion.--.

Signed and Sealed this
Twenty-ninth Day of December, 2015

Michelle K. Lee
*Director of the United States Patent and Trademark Office*